(12) United States Patent
Galal et al.

(10) Patent No.: US 7,500,244 B2
(45) Date of Patent: Mar. 3, 2009

(54) ADAPTIVE ALGORITHM FOR SELECTING A VIRTUALIZATION ALGORITHM IN VIRTUAL MACHINE ENVIRONMENTS

(75) Inventors: Gehad Galal, Rancho Cordova, CA (US); Randolph Campbell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 10/881,784

(22) Filed: Jun. 30, 2004

(65) Prior Publication Data

US 2006/0005199 A1   Jan. 5, 2006

(51) Int. Cl.
G06F 9/455 (2006.01)
G06F 9/46 (2006.01)

(52) U.S. Cl. .......................................... 718/108; 718/1

(58) Field of Classification Search ............. 718/1, 718/102, 108; 703/17, 22–23, 26–27; 708/100
See application file for complete search history.

(56) References Cited

U.S. PATENT DOCUMENTS

| 4,253,145 | A | * | 2/1981 | Goldberg | 703/21 |
| 4,400,769 | A | | 8/1983 | Kaneda et al. | |
| 6,671,762 | B1 | * | 12/2003 | Soni et al. | 710/267 |
| 6,944,699 | B1 | * | 9/2005 | Bugnion et al. | 710/269 |
| 7,127,548 | B2 | * | 10/2006 | Bennett et al. | 711/6 |
| 7,296,267 | B2 | * | 11/2007 | Cota-Robles et al. | 718/1 |
| 7,313,797 | B2 | * | 12/2007 | Sundaram et al. | 718/108 |
| 2003/0187904 | A1 | | 10/2003 | Bennett et al. | |
| 2003/0217250 | A1 | | 11/2003 | Bennett et al. | |
| 2005/0080753 | A1 | * | 4/2005 | Vega et al. | 706/21 |
| 2005/0132364 | A1 | * | 6/2005 | Tewari et al. | 718/1 |
| 2005/0132367 | A1 | * | 6/2005 | Tewari et al. | 718/1 |

FOREIGN PATENT DOCUMENTS

JP          60105052          10/1985

OTHER PUBLICATIONS

Coffing, C.L., "An X86 Protected Mode Virtual Machine Monitor for the MIT Exokemel" MIT Lab for Computer Science, May 1999, pp. 1-109, XP008053120.
Robert P. Goldberg; "Survey of Virtual Machine Research" Computer; vol. 7, No. 6; Jun. 1974.

* cited by examiner

*Primary Examiner*—Meng-Ai An
*Assistant Examiner*—Qing-Yuan Wu
(74) *Attorney, Agent, or Firm*—Blakely, Sokoloff, Taylor & Zafman LLP (57) ABSTRACT

Method for selecting a virtualization algorithm to virtualize a context change. An exit-enter time (EET) to exit and enter a context and a save-restore time (SRT) to save and restore a machine state are calculated. A selective algorithm that selectively saves and restores the machine state when there is a change of context is executed. Statistics are accumulated on an expected value for EET overhead plus an expected value for SRT overhead while executing the selective algorithm. A cost of the selective algorithm is computed as the expected value for EET overhead plus the expected value for SRT overhead. The cost of the selective algorithm is compared to two times SRT which is the cost of an unconditional algorithm that always saves and restores the machine state on context changes. One of the selective algorithm or the unconditional algorithm having the least cost is selected as the virtualization algorithm.

63 Claims, 4 Drawing Sheets

ADAPTIVE ALGORITHM FOR SELECTING A VIRTUALIZATION ALGORITHM IN VIRTUAL MACHINE ENVIRONMENTS

BACKGROUND

A Virtual Machine (VM) is an efficient, isolated duplicate of a real computer system. More than one VM may be provided concurrently by a single real system. A real system may have a number of resources that it provides to an operating system or application software for use. The central processing unit (CPU), also referred to as the processor, and motherboard chipset may provide a set of instructions and other foundational elements for processing data, memory allocation, and input/output (I/O) handling. The real system may further include hardware devices and resources such as memory, video, audio, disk drives, and ports (universal serial bus, parallel, serial). In a real system, the basic I/O system (BIOS) provides a low level interface that an operating system can use to access various motherboard and I/O resources. With a real system, when an operating system accesses a hardware device, it typically communicates through a low-level device driver that interfaces directly to physical hardware device memory or I/O ports.

When a system is hosting a virtual machine environment, one or more guest software applications may be executed by the CPU in such a manner that each guest software application (guest) can execute as though it were executing with exclusive control of the system. This may require that the CPU execute a Virtual Machine Monitor (VMM) along with the guest to prevent the guest from altering the state of the system in a way that would conflict with the execution of other guests. The VMM may be referred to as the monitor. The VMM may be provided as software, firmware, hardware, or a combination of two or more of these.

The VMM may place the processor in a mode where execution of certain instructions that could alter the state of the CPU and create conflicts with other guests will trap execution of the instruction and pass control to the VMM. Instructions which are trapped may be called privileged instructions. The VMM is then able to handle the guest attempt to execute a privileged instruction in a manner that makes the trapping of the instruction transparent to the guest while preventing the processor from being placed in a state that interferes with the execution of other guests. When a guest executes privileged instructions that inspect or modify hardware state, which appear to the guest to be directly executing on the hardware, the privileged instructions are instead virtualized by the VM and passed to the VMM.

When a trap to the VMM occurs, the VMM may save the state of the processor as it was when the privileged instruction was executed by the guest. The VMM may then restore the state of the processor to what it should be after execution of the privileged instruction before control is returned to the guest. The trap from guest to VMM is referred to as a VMEXIT. The monitor may resume the guest with either of a VMRESUME or a VMLAUNCH instruction, which may be collectively referred to as a VMENTER. The time taken by a VMEXIT and VMENTER pair is referred to as the Exit-Enter Time (EET).

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
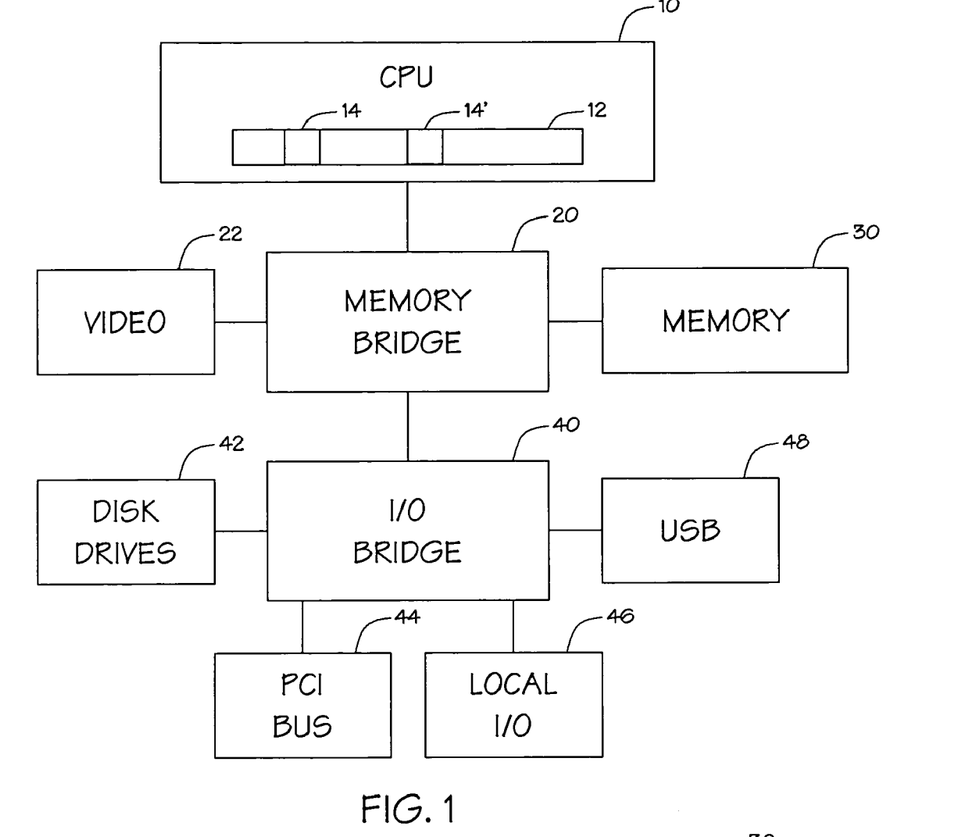
FIG. 1 is a block diagram of a computer system that embodies the invention.

As shown in FIG. 1, a computer system may include a central processing unit (CPU) 10, also referred to as a processor, coupled to a random access memory (RAM) 30. A memory bridge 20 may couple the processor 10 to the memory 30. The RAM may be any of a variety of types of memory such as synchronous dynamic random access memory (SDRAM), RAMBUS® dynamic random access memory (RDRAM), or extended data out random access memory (EDO RAM).

The computer system may include a number of devices that are coupled to the processor 10. A video device 22 may provide a visual display that may receive data from the processor 10 through the memory bridge 20. The memory bridge may also be coupled to an I/O bridge 40. The I/O bridge may be coupled in turn to various devices such as disk drives 42, a Peripheral Component Interconnect (PCI) bus 44 that support various expansion cards, local I/O devices 46 such as timers and power control devices, and Universal Serial Bus (USB) 48 connectors.

The RAM 30 may be loaded with data that represents executable instructions that may be executed by the processor 10. The RAM 30 may further contain data structures used by the processor to control the execution of the processor such as pointers to routines to be executed when certain conditions are detected, data structures such as push down stacks to temporarily hold data being used by the processor, and other data structures to define the processing environment such as task contexts. It will be understood that the amount of RAM 30 accessible by the processor 10 may exceed the amount of RAM that is physically present in the computer system. Various memory management techniques may be used to manipulate the contents of the physical RAM 30 so that it appears to the processor 10 that all of the accessible RAM is present. The contents of the RAM 30 will be described as though all accessible RAM is physically present to avoid obscuring the operation of the described embodiments of the invention but it should be understood that the structures described as being in memory may not all be in physical memory concurrently and that different memory structures may occupy the same physical memory successively while remaining logically distinct.

Figure 2:
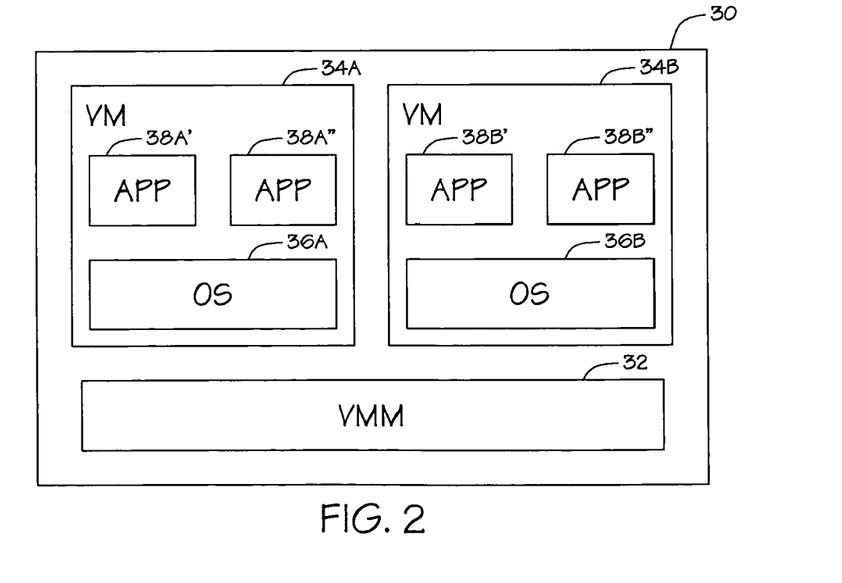
FIG. 2 is a layout of data in a random access memory of the computer system shown in FIG. 1.

The processor 10 may be used to host one or more virtual machines (VMs). As shown in FIG. 2, a portion of RAM 30 may be assigned to each virtual machine 34 as a virtual machine context. The assigned portion of RAM 30 may be all or part of the RAM available to the processor 10. The assigned portion of RAM 30 may be loaded and unloaded as required to allow one virtual machine 34A to use some or all of the physical RAM assigned to another virtual machine 34B. The RAM 30 may support a virtual memory system to manage the use of the RAM so that each virtual machine 34A is able to use the RAM without regard to other virtual machines 34B that might also be hosted by the processor 10.

Each virtual machine 34A provides an environment for the execution of software that appears to be a dedicated physical machine that is protected and isolated from other virtual machines 34B. While only two virtual machines are shown, it is to be understood that any number of virtual machines may be hosted by the processor used in embodiments of the invention. Guest software may be executed in each virtual machine 34. The guest software may have an operating system (OS) 36 and one or more application programs 38 that are executed by the OS. The OS 36 on each virtual machine 34 may be the same or different than the OS on other virtual machines.

The processor may host a Virtual Machine Monitor (VMM) 32 to manage the one or more virtual machines 34. The VMM 32 may trap the execution of certain instructions, which may be termed privileged instructions, by the virtual machines 34 so that each virtual machine 34A is able to operate without regard to other virtual machines 34B that might also be hosted by the processor 10. Privileged instructions may make a persistent change to the state of the processor that would alter the behavior of other virtual machines executed thereafter. The VMM 32 may virtualize the execution of privileged instructions that are trapped so that these instructions provide the expected machine state for the currently executing context without having the machine state persist to affect the later execution of other virtual machines.

Floating point operations using a Floating Point Unit (FPU) are examples of privileged instructions that may be virtualized. Guest software running in a virtual machine assumes that it can use the FPU as required to perform floating point arithmetic. FPU operations may use and affect a number of registers, which may be relatively wide, to hold floating point values. The VMM may virtualize the FPU for each of the virtual machines so that the registers as set by the operation of each virtual machine are present whenever the virtual machine is using the FPU. The virtualization of the FPU may be accomplished by one of several algorithms.

Figure 3:
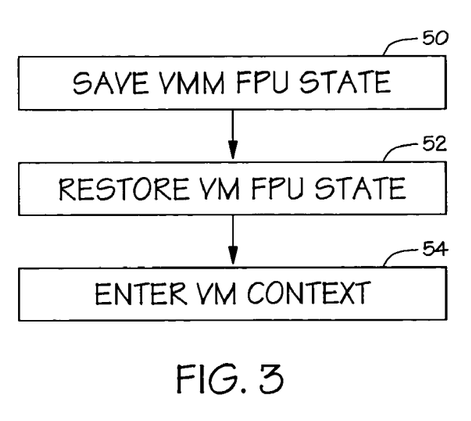
FIG. 3 is a flow chart for transferring control to a VM using an unconditional virtualization algorithm.
Figure 4:
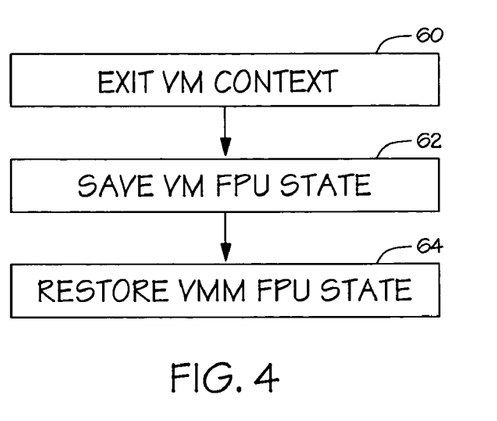
FIG. 4 is a flow chart for transferring control to a VMM using an unconditional virtualization algorithm.

An algorithm for virtualization of the FPU, shown in the flow charts of FIGS. 3 and 4, may save the VMM's FPU state 50 and restore the virtual machine's FPU state 52 just prior to entering the virtual machine context 54. This may be termed an unconditional algorithm because the machine state is always saved and the state for the new context is restored on context changes. Shortly after the virtual machine context exits to the VMM 60, the virtual machine's FPU state is saved 62 and the VMM's FPU state is restored 64. The unconditional algorithm ensures that the FPU state is such that the VMM and each virtual machine can use the FPU without conflict with the other users of the FPU. The time consumed by the unconditional virtualization algorithm for each virtual machine context entered is twice the Save-Restore Time (SRT). SRT is the time required to save the FPU state of one context and restore the FPU state of another context which occurs twice for each transfer of control to a virtual machine, once at the start and once at the end of the transfer. Thus the unconditional algorithm overhead time cost is 2×SRT.

It is possible that the VMM or a guest may not use the FPU. In such cases it is unnecessary to save and restore the FPU state. If such cases can be detected so that the FPU state is saved and restored less frequently than is done by the unconditional algorithm, it may be possible to reduce the overhead associated with virtualization of the FPU.

As shown in FIG. 1, the processor 10 may include a control register 12 to determine whether a currently executing task can execute instructions that affect the machine state. The control register 12 may be a predetermined location in memory 30, not shown, or a data storage location within the processor 10, as shown in FIG. 1. A control register 12, such as Control Register 0 (CR0) in an IA-32 Intel® Architecture processor 10, may include a flag 14 to control if one or more instructions are privileged, such as the Task Switched (TS) bit 3 of CR0 which controls whether floating point instruction will be executed or cause an exception. Another exemplary processor state flag 14' controlling instruction privilege is the Monitor Coprocessor (MP) bit 1 of CR0.

The state of the control register 12 may be used to determine if a save and restore of the FPU state is required. If the processor 10 is configured so that the instructions that persistently affect the processor state are privileged, then the state that is protected by making the instructions privileged does not need to be saved as an exception will cause control to be transferred to the VMM if and when the currently executing task attempts to use the protected state. For example, if the control register 12 includes TS 14 and MP 14' bits, both bits being set may configure the processor 10 so that all instructions that use or affect the FPU state will cause an exception. If it is determined that the thread to which the VMM is preparing to transfer control has not cleared either of these bits, then it is not necessary to save and restore the FPU state prior to transferring control to the thread. However, if the thread has configured the processor so that one or more instructions that use or affect the FPU state are not privileged, then the FPU state as set by the VMM is saved and the FPU state as set by the thread when previously executed is restored.

Algorithms to minimize the overhead of virtualization may attempt to minimize the number of times a FPU save and restore is required. This can be achieved with various algorithms. Some algorithms may delay the save and restore until the FPU is about to be used in a context which does not currently own the FPU, such as when VM(i) uses the FPU while the FPU context is that of VM(j). Other algorithms may delay the save and restore until the FPU is highly likely to be used in a context that does not own the FPU. These may be termed selective algorithms because the machine state is only saved and the state for the new context restored on context changes when it appears that the machine state will be used by the new context.

Figure 5:
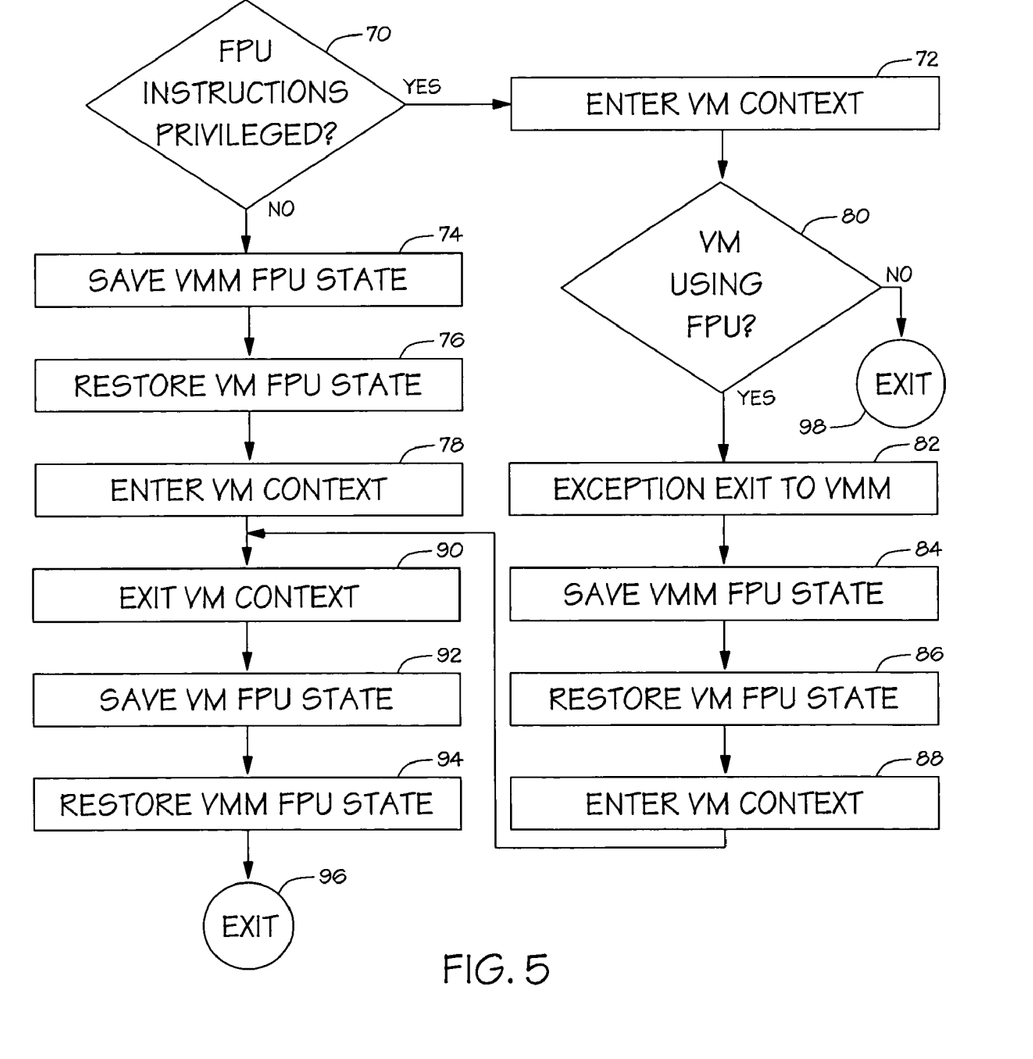
FIG. 5 is a flow chart for a selective virtualization algorithm that saves an FPU state only if the VM receives control with unprivileged instruction to use the FPU.
Figure 6:
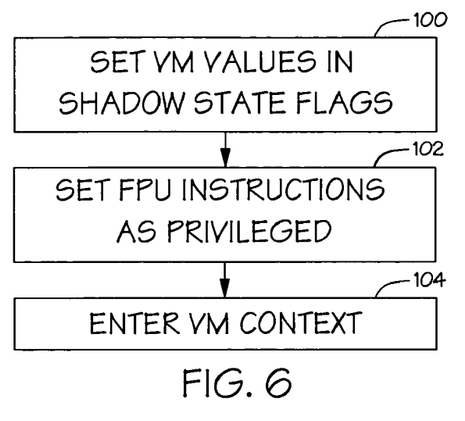
FIG. 6 is a flow chart for transferring control to a VM using a selective virtualization algorithm that makes instruction to use the FPU privileged before control is passed.

FIG. 5 illustrates an exemplary selective algorithm for virtualization of the FPU that uses the processor state for privilege of instructions in an attempt to perform the save and restore only when the FPU is highly likely to be used in a context that does not own the FPU. This exemplary selective algorithm assumes that the VMM always uses the FPU and therefore anytime a VM is going to use the FPU a save and restore of the FPU state will be required.

If the processor state for the VM that is to receive control makes the instructions that use or affect the FPU state privileged 70-YES, then the selective algorithm assumes that the VM will not use the FPU and does not do a save and restore of the FPU state. The VM context will be entered 72 with the VMM's FPU state. Conversely, if the processor state for the VM makes the FPU instructions unprivileged 70-NO, then the selective algorithm assumes that the VM will use the FPU and the VMM FPU state is saved 74 and the VM FPU state restored 76 before the VM context is entered 78. If the VM does use the FPU when the selective algorithm assumed that it would not 80-YES, either by attempting to change the processor state with regard to privilege or by simply executing the privileged FPU instructions, then the processor will raise an exception and transfer control to the VMM 82. In response to this exception the VMM will save the FPU state of the VMM 84 and restore the FPU state for use by the VM 86. The VMM then re-enters the VM context 88. If the VM FPU state was restored either before or during execution of the VM context, then upon exiting the VM context 90 the VM's FPU state will be saved 92 and the VMM's FPU state will be restored 94 before the selective virtualization algorithm exits 96. If the FPU state was privileged 70-YES and the VM did not use the FPU 80-NO, then the selective virtualization algorithm exits 98 having avoided the SRT cost.

The selective algorithm incurs costs in terms of the overhead time of the FPU virtualization algorithm. If the selective algorithm correctly predicts that the VM will not use the FPU, thus avoiding an unnecessary save and restore, the cost is zero. If the selective algorithm correctly predicts that the VM will use the FPU, the cost is twice the Save-Restore Time (2×SRT), the same cost as the unconditional algorithm. If the selective algorithm incorrectly predicts that the VM will not use the FPU, thus causing an exception to be raised leading to a save and restore, the cost is EET+2×SRT. This latter case incurs a higher cost than the unconditional algorithm. Thus the ability of the selective algorithm to reduce the overhead of FPU virtualization from the overhead of the unconditional algorithm depends on the effectiveness of the selective algorithm in predicting that the VM will not use the FPU.

If the fraction of correct predictions that the VM will not use the FPU is Q, and the fraction of incorrect predictions that the VM will not use the FPU is R, then the fraction of correct predictions that the VM will use the FPU is (1−Q−R). The actual overhead of the selective algorithm is then $$((1-Q-R) \times 2 \times SRT) + (R \times (2 \times SRT + EET)) + (Q \times 0)$$

which reduces to $$2 \times SRT - 2Q \times SRT - 2R \times SRT + 2R \times SRT + R \times EET$$

which further reduces to $$2 \times SRT - 2Q \times SRT + R \times EET$$

which further reduces to $$2 \times SRT(1-Q) + R \times EET$$

2× SRT (1−Q) represents the expected value for SRT overhead and R×EET represents the expected value for EET overhead. Expected value of overhead is used to mean the statistical expectation of time cost for a context change based on the observation of a number of context changes. The selective algorithm will incur less cost in overhead than the unconditional algorithm if $$2 \times SRT(1-Q) + R \times EET < 2 \times SRT$$

which reduces to $$R \times EET < 2Q \times SRT$$

which further reduces to $$EET/(2 \times SRT) < Q/R$$

EET and SRT are relatively constant times that can be computed for a given processor environment. Thus the effectiveness of the selective algorithm can be compared to the unconditional algorithm by measuring the fraction of correct predictions, Q, and incorrect predictions, R, that the VM will not use the FPU, and comparing the ratio Q/R to the precomputed constant EET/(2×SRT).

FIGS. 6-9 show another exemplary selective algorithm for virtualization of the FPU. This selective algorithm puts the processor in the state where the instructions that use or affect the FPU state are privileged before entering the VM context. The processor state is virtualized, for example by providing shadow copies of the processor state flags such as CR0.TS and CR0.MP that reflect the processor state as perceived by the VM 100. The processor is configured so that the FPU instructions are privileged 102. Control is transferred to the VM context 104 where use of the FPU or of the processor state flags will result in a processor exception that exits to the VMM.

Figure 7:
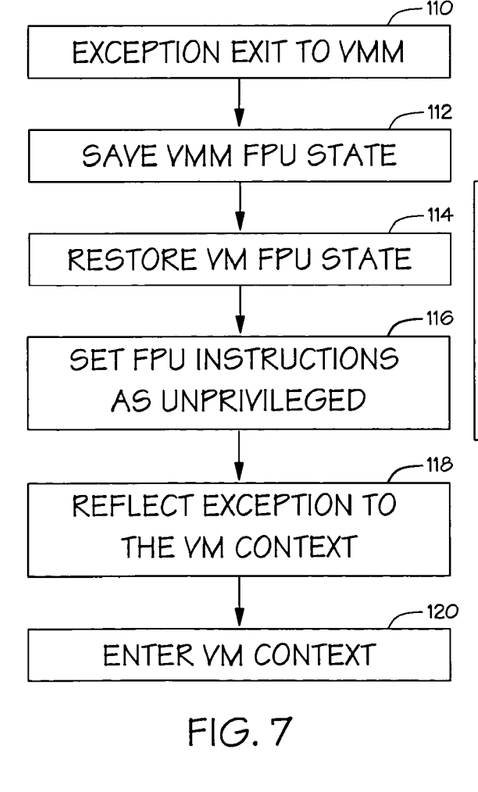
FIG. 7 is a flow chart for processing an FPU use exception following entry to the VM shown in FIG. 6.

FIG. 7 is a flowchart for the processing of an FPU exception by the VMM. An attempted execution of a privileged instruction to use the FPU by the VM creates an exception that causes an exit to the VMM 110. The VMM's FPU state is saved 112 and the VM's FPU state is restored 114. Since it is now safe for the FPU to use the FPU, the processor is configured so that the FPU instructions are unprivileged 116. This means there will be at most one FPU exception for a transfer of control to a VM context. The FPU exception may also be reflected to the VM context 118 for possible use by programs executing in the VM context, such as an operating system. Control is then returned to the VM context 120. The time overhead cost of the FPU exception processing is the EET plus the SRT. A second SRT is incurred upon exiting the VM context as discussed below.

Figure 8:
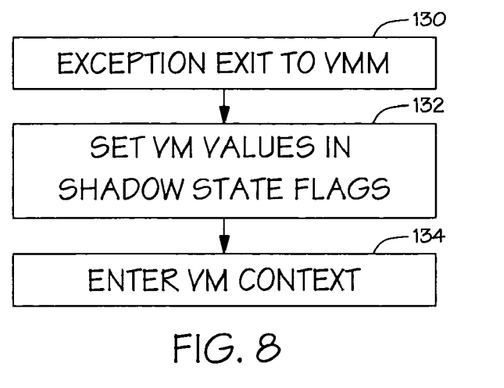
FIG. 8 is a flow chart for processing state flag change exception following entry to the VM shown in FIG. 6.

FIG. 8 is a flowchart for the VMM processing of an attempt by the VM to change a processor state flag. An attempt to change a state flag by the VM creates an exception that causes an exit to the VMM 130. The VMM updates the virtualized state flags, such as by setting values of shadow state flags, according to the changes attempted by the VM 132. Control is then returned to the VM context 134. The time overhead cost of the state change exception processing is the EET. The VM may make any number of changes to the state flags during a single transfer of control to a VM context.

Figure 9:
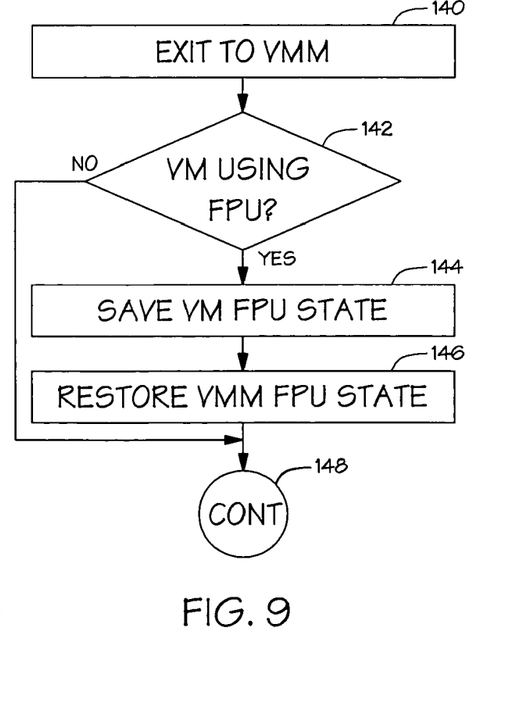
FIG. 9 is a flow chart for transferring control to a VMM from the VM entered as shown in FIG. 6.

FIG. 9 is a flowchart for the VMM processing when the VM context is exited 140. If the VM is using the FPU 142-YES, meaning that the processing of FIG. 8 occurred during the transfer of control to the VM context, then the VM's FPU state is saved 144 and the VMM's FPU state is restored 146 before VMM processing continues 148. This incurs the time overhead cost of a second SRT as mentioned above.

There are four possible scenarios with regard to the time overhead cost of this selective algorithm:

(1) The VM does not change the processor state flags or use the FPU, producing no overhead cost;
(2) The VM does not change the processor state flags but does use the FPU, producing an overhead cost of 2×SRT+EET;
(3) The VM does change the processor state flags but does not use the FPU, producing an overhead cost of EET for each change;
(4) The VM does change the processor state flags and does use the FPU, producing an overhead cost of EET for each change of processor state plus an overhead cost of 2×SRT+ EET when the FPU is used.

If S is the fraction of VM executions that use the FPU and T is the average number of exception created by a change the processor state flags or use of the FPU, the total overhead of this selective algorithm is:

$$S \times 2 \times SRT + T \times EET$$

S×2×SRT represents the expected value for SRT overhead and T×EET represents the expected value for EET overhead. This selective algorithm has a lower cost in overhead time than the unconditional algorithm if $$S \times 2 \times SRT + T \times EET < 2 \times SRT$$

This reduces to $$T \times EET < 2 \times SRT \times (1-S)$$

which reduces further to $$EET/(2 \times SRT) < (1-S)/T$$

As with the previously discussed selective algorithm, EET and SRT are relatively constant times that can be computed for a given processor environment. Thus the effectiveness of this selective algorithm can be compared to the unconditional algorithm by measuring the fraction of executions where the VM does not use the FPU, (1−S), and the average number of exception raised, T, and comparing the ratio (1−S)/T to the precomputed constant EET/(2×SRT).

Other exemplary selective algorithms may not assume that the VMM always uses the FPU and track the present owner of the FPU state to further reduce the overhead of the FPU virtualization. Such selective algorithms may maintain a value that indicates the present owner of the FPU state since the currently running thread may not be the owner. Such selective algorithms are able to simply enter a virtual machine if the value indicates that the virtual machine being entered owns the FPU state with a possible savings of 2×SRT. This will of course affect the expression for the overhead cost of the selective virtualization algorithm that may be used to select the virtualization algorithm, such as by comparing a metric derived from the expression for the overhead cost to the precomputed constant EET/(2×SRT).

Figure 10:
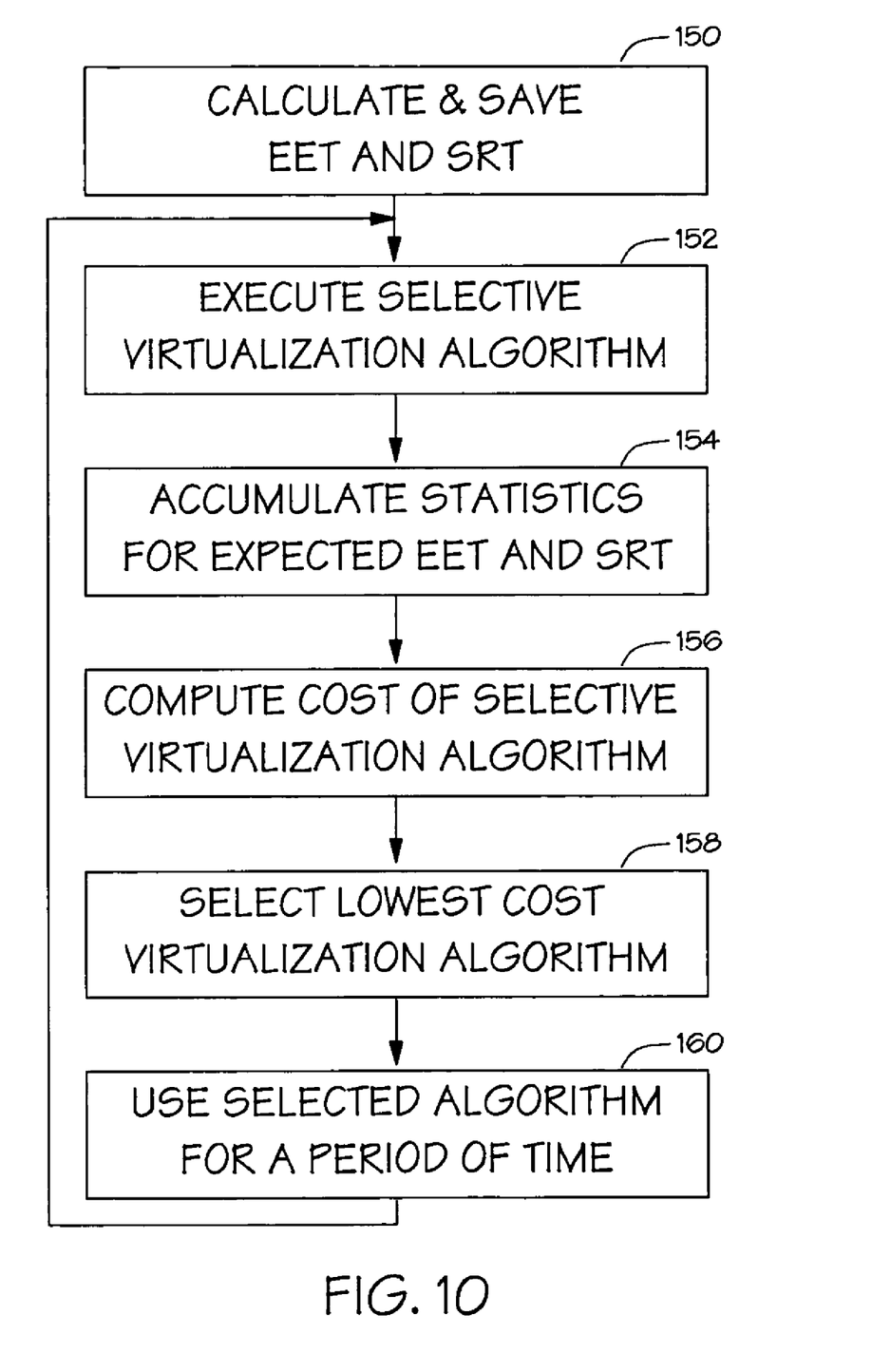
FIG. 10 is a flow chart for an adaptive algorithm for selecting a virtualization algorithm.

It will be appreciated that no one virtualization algorithm will be lowest in cost at all times. Changes in the work load may make different virtualization algorithms more efficient at different times. FIG. 10 is a flowchart for an adaptive algorithm that may be used to periodically select the virtualization algorithm. The following is an exemplary adaptive algorithm to select either the unconditional virtualization algorithm or a selective algorithm that selectively saves and restores the machine state:

calculating an exit-enter time (EET) to exit and enter a context and a save-restore time (SRT) to save and restore a machine state 150;

executing a selective algorithm that saves and restores the machine state on selected context changes 152 and accumulating statistics for an expected value for EET overhead and an expected value for SRT overhead while executing the selective algorithm 154;

computing a cost of the selective algorithm using the expected value for EET overhead and the expected value for SRT overhead 156;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes 158.

The calculating of EET and SRT may be performed only once and the results saved 150 as these values are essentially constant for a given processor configuration. The selected virtualization algorithm is used for a period of time 160 and then the adaptive algorithm is again used to select the virtualization algorithm so that the virtualization algorithm in use may change from time to time as the workload changes. The length of time for accumulating statistics on the selective algorithm and the interval between successive accumulations and possible changes in virtualization algorithms may be responsive to the workload of the processor.

The adaptive algorithm may be extended to a selection from more than two candidate algorithms. Each of the selective algorithms that selectively saves and restores the machine state when there is a change of context may be executed to allow statistics to be accumulated as to the overhead time cost of the selective algorithm under the processing workload at that time. Costs are computed for each of the selective algorithms and the lowest cost algorithm from amongst all candidate algorithms is selected.

It will be appreciated that embodiments of the invention may be in the form of an article of manufacture that includes a machine-accessible medium. The machine-accessible medium may include data that, when accessed by a processor 10, cause the processor to perform operations. Thus, a machine-accessible medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented method comprising:

calculating an exit-enter time (EET) to exit and enter a context and a save-restore time (SRT) to save and restore a machine state;

executing a selective algorithm that saves and restores the machine state before passing control to a virtual machine (VM) only if unprivileged instructions allowing use of the machine state are available to the VM and accumulating statistics for an expected value for EET overhead and an expected value for SRT overhead while executing the selective algorithm;

computing a cost of the selective algorithm using the expected value for EET overhead and the expected value for SRT overhead;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes.

2. The method of claim 1, wherein calculating the EET and the SRT is performed only once and the EET and the SRT are saved.

3. The method of claim 1, wherein accumulating statistics includes:
obtaining a fraction of correct predictions where the machine state is not saved before passing control to the VM and the machine state is not used by the VM; and
obtaining a fraction of incorrect predictions where the machine state is not saved before passing control to the VM and the machine state is used by the VM;
wherein selecting one of the selective algorithm or the unconditional algorithm includes:
comparing a ratio of EET and SRT to a ratio of the fraction of correct predictions and the fraction of incorrect predictions.

4. The method of claim 1, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

5. The method of claim 4, wherein accumulating statistics includes:
obtaining a fraction of executions where the machine state is not used by the VM; and
obtaining an average number of exceptions raised by each execution of the VM;
wherein selecting one of the selective algorithm or the unconditional algorithm includes:
comparing a ratio of EET and SRT to a ratio of the fraction of executions and the average number of exceptions.

6. The method of claim 1, wherein executing, accumulating, computing, and selecting are performed periodically.

7. The method of claim 1, further comprising:
executing a second selective algorithm that selectively saves and restores the machine state when there is a change of context;
accumulating statistics on an expected value for EET per context change plus an expected value for SRT per context change for the second selective algorithm;
computing a third cost of the second selective algorithm as the expected value for EET per context change plus the expected value for SRT per context change; and
selecting one of the unconditional algorithm, the selective algorithm, or the second selective algorithm having the least cost.

8. An article of manufacture comprising:
a machine-accessible medium including data that, when accessed by a processor, cause the processor to perform operations comprising,
calculating an exit-enter time (EET) to exit and enter a context and a save-restore time (SRT) to save and restore a machine state;
executing a selective algorithm that saves and restores the machine state before passing control to a virtual machine (VM) only if unprivileged instructions allowing use of the machine state are available to the VM and accumulating statistics for an expected value for EET overhead and an expected value for SRT overhead while executing the selective algorithm;
computing a cost of the selective algorithm using the expected value for EET overhead and the expected value for SRT overhead;
comparing the cost of the selective algorithm to two times SRT which is the cost of an unconditional algorithm that always saves and restores the machine state on context changes; and
selecting one of the selective algorithm or the unconditional algorithm having the least cost as a virtualization algorithm to virtualize context changes.

9. The article of manufacture of claim 8, wherein calculating the EET and the SRT is performed only once and the EET and the SRT are saved.

10. The article of manufacture of claim 8, wherein accumulating statistics includes:
obtaining a fraction of correct predictions where the machine state is not saved before passing control to the VM and the machine state is not used by the VM; and
obtaining a fraction of incorrect predictions where the machine state is not saved before passing control to the VM and the machine state is used by the VM;
wherein selecting one of the selective algorithm or the unconditional algorithm includes:
comparing a ratio of EET and SRT to a ratio of the fraction of correct predictions and the fraction of incorrect predictions.

11. The article of manufacture of claim 8, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

12. The article of manufacture of claim 11, wherein accumulating statistics includes:
obtaining a fraction of executions where the machine state is not used by the VM; and
obtaining an average number of exceptions raised by each execution of the VM;
wherein selecting one of the selective algorithm or the unconditional algorithm includes:
comparing a ratio of EET and SRT to a ratio of the fraction of executions and the average number of exceptions.

13. The article of manufacture of claim 8, wherein executing, accumulating, computing, and selecting are performed periodically.

14. The article of manufacture of claim 8, wherein the machine-accessible medium further includes data that, when accessed by the processor, cause the processor to perform further operations comprising:
executing a second selective algorithm that selectively saves and restores the machine state when there is a change of context rather than an unconditional algorithm that saves and restores a machine state on each change of context, which has a first cost of two times SRT;
accumulating statistics on an expected value for EET per context change plus an expected value for SRT per context change for the second selective algorithm;
computing a third cost of the second selective algorithm as the expected value for EET per context change plus the expected value for SRT per context change; and
selecting one of the unconditional algorithm, the selective algorithm, or the second selective algorithm having the least cost.

15. A system comprising:
a processor that provides a machine state and can be configured such that the processor makes all instructions that use the machine state privileged;

a memory coupled to the processor, the memory selected from one of an SDRAM memory and an RDRAM memory, the memory including data that, when accessed by the processor, cause the processor to perform operations comprising, calculating an exit-enter time (EET) to exit and enter a context and a save-restore time (SRT) to save and restore a machine state;

executing a selective algorithm that saves and restores the machine state before passing control to a virtual machine (VM) only if unprivileged instructions allowing use of the machine state are available to the VM and accumulating statistics for an expected value for EET overhead and an expected value for SRT overhead while executing the selective algorithm;

executing a selective algorithm that saves and restores the machine state on selected context changes and accumulating statistics for an expected value for EET overhead and an expected value for SRT overhead while executing the selective algorithm;

computing a cost of the selective algorithm using the expected value for EET overhead and the expected value for SRT overhead;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes.

16. The system of claim 15, wherein calculating the EET and the SRT is performed only once and the EET and the SRT are saved.

17. The system of claim 15, wherein accumulating statistics includes:

obtaining a fraction of correct predictions where the machine state is not saved before passing control to the VM and the machine state is not used by the VM; and obtaining a fraction of incorrect predictions where the machine state is not saved before passing control to the VM and the machine state is used by the VM;

wherein selecting one of the selective algorithm or the unconditional algorithm includes:

comparing a ratio of EET and SRT to a ratio of the fraction of correct predictions and the fraction of incorrect predictions.

18. The system of claim 15, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

19. The system of claim 18, wherein accumulating statistics includes:

obtaining a fraction of executions where the machine state is not used by the VM; and obtaining an average number of exceptions raised by each execution of the VM;

wherein selecting one of the first or the selective algorithm includes:

comparing a ratio of EET and SRT to a ratio of the fraction of executions and the average number of exceptions.

20. The system of claim 15, wherein executing, accumulating, computing, and selecting are performed periodically.

21. The system of claim 15, wherein the memory further includes data that, when accessed by the processor, cause the processor to perform further operations comprising:

executing a second selective algorithm that selectively saves and restores the machine state when there is a change of context rather than an unconditional algorithm that saves and restores a machine state on each change of context, which has a first cost of two times SRT;

accumulating statistics on an expected value for EET per context change plus an expected value for SRT per context change for the second selective algorithm;

computing a third cost of the second selective algorithm as the expected value for EET per context change plus the expected value for SRT per context change; and selecting one of the unconditional algorithm, the selective algorithm, or the second selective algorithm having the least cost.

22. A computer-implemented method comprising:

calculating an exit-enter time (EET) to exit and enter a context and a save-restore time (SRT) to save and restore a machine state;

executing a selective algorithm that saves and restores the machine state on selected context changes, virtualizes configuration of a processor such that the processor makes all instructions that use the machine state privileged to a virtual machine (VM), and saves and restores the machine state in connection with passing control to a virtual machine (VM) only if the VM executes a privileged instruction that uses the machine state, and accumulating statistics for an expected value for EET overhead and an expected value for SRT overhead while executing the selective algorithm;

computing a cost of the selective algorithm using the expected value for EET overhead and the expected value for SRT overhead;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes.

23. The method of claim 22, wherein calculating the EET and the SRT is performed only once and the EET and the SRT are saved.

24. The method of claim 22, wherein the selective algorithm saves and restores the machine state before passing control to a virtual machine (VM) only if unprivileged instructions allowing use of the machine state are available to the VM.

25. The method of claim 24, wherein accumulating statistics includes:

obtaining a fraction of correct predictions where the machine state is not saved before passing control to the VM and the machine state is not used by the VM; and obtaining a fraction of incorrect predictions where the machine state is not saved before passing control to the VM and the machine state is used by the VM;

wherein selecting one of the selective algorithm or the unconditional algorithm includes:

comparing a ratio of EET and SRT to a ratio of the fraction of correct predictions and the fraction of incorrect predictions.

26. The method of claim 22, wherein accumulating statistics includes:

obtaining a fraction of executions where the machine state is not used by the VM; and obtaining an average number of exceptions raised by each execution of the VM;

wherein selecting one of the selective algorithm or the unconditional algorithm includes:

comparing a ratio of EET and SRT to a ratio of the fraction of executions and the average number of exceptions.

27. The method of claim 22, wherein executing, accumulating, computing, and selecting are performed periodically.

28. The method of claim 22, further comprising:

executing a second selective algorithm that selectively saves and restores the machine state when there is a change of context;

accumulating statistics on an expected value for EET per context change plus an expected value for SRT per context change for the second selective algorithm;

computing a third cost of the second selective algorithm as the expected value for EET per context change plus the expected value for SRT per context change; and selecting one of the unconditional algorithm, the selective algorithm, or the second selective algorithm having the least cost.

29. An article of manufacture comprising:

a machine-accessible medium including data that, when accessed by a processor, cause the processor to perform operations comprising, calculating an exit-enter time (EET) to exit and enter a context and a save-restore time (SRT) to save and restore a machine state;

executing a selective algorithm that saves and restores the machine state on selected context changes, virtualizes configuration of a processor such that the processor makes all instructions that use the machine state privileged to a virtual machine (VM), and saves and restores the machine state in connection with passing control to a virtual machine (VM) only if the VM executes a privileged instruction that uses the machine state, and accumulating statistics for an expected value for EET overhead and an expected value for SRT overhead while executing the selective algorithm;

computing a cost of the selective algorithm using the expected value for EET overhead and the expected value for SRT overhead;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes.

30. The article of manufacture of claim 29, wherein calculating the EET and the SRT is performed only once and the EET and the SRT are saved.

31. The article of manufacture of claim 29, wherein the selective algorithm saves and restores the machine state before passing control to a virtual machine (VM) only if unprivileged instructions allowing use of the machine state are available to the VM.

32. The article of manufacture of claim 31, wherein accumulating statistics includes:

obtaining a fraction of correct predictions where the machine state is not saved before passing control to the VM and the machine state is not used by the VM; and obtaining a fraction of incorrect predictions where the machine state is not saved before passing control to the VM and the machine state is used by the VM;

wherein selecting one of the selective algorithm or the unconditional algorithm includes:

comparing a ratio of EET and SRT to a ratio of the fraction of correct predictions and the fraction of incorrect predictions.

33. The article of manufacture of claim 29, wherein accumulating statistics includes:

obtaining a fraction of executions where the machine state is not used by the VM; and obtaining an average number of exceptions raised by each execution of the VM;

wherein selecting one of the selective algorithm or the unconditional algorithm includes:

comparing a ratio of EET and SRT to a ratio of the fraction of executions and the average number of exceptions.

34. The article of manufacture of claim 29, wherein executing, accumulating, computing, and selecting are performed periodically.

35. The article of manufacture of claim 29, wherein the machine-accessible medium further includes data that, when accessed by the processor, cause the processor to perform further operations comprising:

executing a second selective algorithm that selectively saves and restores the machine state when there is a change of context rather than an unconditional algorithm that saves and restores a machine state on each change of context, which has a first cost of two times SRT;

accumulating statistics on an expected value for EET per context change plus an expected value for SRT per context change for the second selective algorithm;

computing a third cost of the second selective algorithm as the expected value for EET per context change plus the expected value for SRT per context change; and selecting one of the unconditional algorithm, the selective algorithm, or the second selective algorithm having the least cost.

36. A system comprising:

a processor that provides a machine state and can be configured such that the processor makes all instructions that use the machine state privileged;

a memory coupled to the processor, the memory selected from one of an SDRAM memory and an RDRAM memory, the memory including data that, when accessed by the processor, cause the processor to perform operations comprising, calculating an exit-enter time (EET) to exit and enter a context and a save-restore time (SRT) to save and restore a machine state;

executing a selective algorithm that saves and restores the machine state on selected context changes, virtualizes configuration of a processor such that the processor makes all instructions that use the machine state privileged to a virtual machine (VM), and saves and restores the machine state in connection with passing control to a virtual machine (VM) only if the VM executes a privileged instruction that uses the machine state, and accumulating statistics for an expected value for EET overhead and an expected value for SRT overhead while executing the selective algorithm;

computing a cost of the selective algorithm using the expected value for EET overhead and the expected value for SRT overhead;

comparing the cost of the selective algorithm to two times SRT which is the cost of an unconditional algorithm that always saves and restores the machine state on context changes; and selecting one of the selective algorithm or the unconditional algorithm having the least cost as a virtualization algorithm to virtualize context changes.

37. The system of claim 36, wherein calculating the EET and the SRT is performed only once and the EET and the SRT are saved.

38. The system of claim 36, wherein the selective algorithm saves and restores the machine state before passing control to a virtual machine (VM) only if unprivileged instructions allowing use of the machine state are available to the VM.

39. The system of claim 38, wherein accumulating statistics includes:

obtaining a fraction of correct predictions where the machine state is not saved before passing control to the VM and the machine state is not used by the VM; and obtaining a fraction of incorrect predictions where the machine state is not saved before passing control to the VM and the machine state is used by the VM;

wherein selecting one of the selective algorithm or the unconditional algorithm includes:

comparing a ratio of EET and SRT to a ratio of the fraction of correct predictions and the fraction of incorrect predictions.

40. The system of claim 36, wherein accumulating statistics includes:

obtaining a fraction of executions where the machine state is not used by the VM; and obtaining an average number of exceptions raised by each execution of the VM;

wherein selecting one of the first or the selective algorithm includes:

comparing a ratio of EET and SRT to a ratio of the fraction of executions and the average number of exceptions.

41. The system of claim 36, wherein executing, accumulating, computing, and selecting are performed periodically.

42. The system of claim 36, wherein the memory further includes data that, when accessed by the processor, cause the processor to perform further operations comprising:

executing a second selective algorithm that selectively saves and restores the machine state when there is a change of context rather than an unconditional algorithm that saves and restores a machine state on each change of context, which has a first cost of two times SRT;

accumulating statistics on an expected value for EET per context change plus an expected value for SRT per context change for the second selective algorithm;

computing a third cost of the second selective algorithm as the expected value for EET per context change plus the expected value for SRT per context change; and selecting one of the unconditional algorithm, the selective algorithm, or the second selective algorithm having the least cost.

43. A computer-implemented method comprising:

calculating an exit-enter time (EET) to exit and enter a context and a save-restore time (SRT) to save and restore a machine state;

executing a selective algorithm that saves and restores the machine state on selected context changes and accumulating statistics for an expected value for EET overhead and an expected value for SRT overhead while executing the selective algorithm;

computing a first cost of the selective algorithm using the expected value for EET overhead and the expected value for SRT overhead;

executing a second selective algorithm that selectively saves and restores the machine state when there is a change of context;

accumulating statistics on an expected value for EET per context change plus an expected value for SRT per context change for the second selective algorithm;

computing a second cost of the second selective algorithm as the expected value for EET per context change plus the expected value for SRT per context change;

computing a third cost of an unconditional algorithm that always saves and restores the machine state on context changes as two times SRT; and selecting one of the selective algorithm, the second selective algorithm, or the unconditional algorithm having the least cost as a virtualization algorithm to virtualize context changes.

44. The method of claim 43, wherein calculating the EET and the SRT is performed only once and the EET and the SRT are saved.

45. The method of claim 43, wherein the selective algorithm saves and restores the machine state before passing control to a virtual machine (VM) only if unprivileged instructions allowing use of the machine state are available to the VM.

46. The method of claim 45, wherein accumulating statistics includes:

obtaining a fraction of correct predictions where the machine state is not saved before passing control to the VM and the machine state is not used by the VM; and obtaining a fraction of incorrect predictions where the machine state is not saved before passing control to the VM and the machine state is used by the VM;

wherein selecting one of the selective algorithm or the unconditional algorithm includes:

comparing a ratio of EET and SRT to a ratio of the fraction of correct predictions and the fraction of incorrect predictions.

47. The method of claim 43, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

48. The method of claim 47, wherein accumulating statistics includes:

obtaining a fraction of executions where the machine state is not used by the VM; and obtaining an average number of exceptions raised by each execution of the VM;

wherein selecting one of the selective algorithm or the unconditional algorithm includes:

comparing a ratio of EET and SRT to a ratio of the fraction of executions and the average number of exceptions.

49. The method of claim 43, wherein executing, accumulating, computing, and selecting are performed periodically.

50. An article of manufacture comprising:

a machine-accessible medium including data that, when accessed by a processor, cause the processor to perform operations comprising, calculating an exit-enter time (EET) to exit and enter a context and a save-restore time (SRT) to save and restore a machine state;

executing a selective algorithm that saves and restores the machine state on selected context changes and accumulating statistics for an expected value for EET overhead and an expected value for SRT overhead while executing the selective algorithm;

computing a first cost of the selective algorithm using the expected value for EET overhead and the expected value for SRT overhead;

executing a second selective algorithm that selectively saves and restores the machine state when there is a change of context;

accumulating statistics on an expected value for EET per context change plus an expected value for SRT per context change for the second selective algorithm;

computing a second cost of the second selective algorithm as the expected value for EET per context change plus the expected value for SRT per context change;

computing a third cost of an unconditional algorithm that always saves and restores the machine state on context changes as two times SRT; and selecting one of the selective algorithm, the second selective algorithm, or the unconditional algorithm having the least cost as a virtualization algorithm to virtualize context changes.

51. The article of manufacture of claim 50, wherein calculating the EET and the SRT is performed only once and the EET and the SRT are saved.

52. The article of manufacture of claim 50, wherein the selective algorithm saves and restores the machine state before passing control to a virtual machine (VM) only if unprivileged instructions allowing use of the machine state are available to the VM.

53. The article of manufacture of claim 52, wherein accumulating statistics includes:
obtaining a fraction of correct predictions where the machine state is not saved before passing control to the VM and the machine state is not used by the VM; and
obtaining a fraction of incorrect predictions where the machine state is not saved before passing control to the VM and the machine state is used by the VM;
wherein selecting one of the selective algorithm or the unconditional algorithm includes:
comparing a ratio of EET and SRT to a ratio of the fraction of correct predictions and the fraction of incorrect predictions.

54. The article of manufacture of claim 50, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

55. The article of manufacture of claim 54, wherein accumulating statistics includes:
obtaining a fraction of executions where the machine state is not used by the VM; and
obtaining an average number of exceptions raised by each execution of the VM;
wherein selecting one of the selective algorithm or the unconditional algorithm includes:
comparing a ratio of EET and SRT to a ratio of the fraction of executions and the average number of exceptions.

56. The article of manufacture of claim 50, wherein executing, accumulating, computing, and selecting are performed periodically.

57. A system comprising:
a processor that provides a machine state and can be configured such that the processor makes all instructions that use the machine state privileged;
a memory coupled to the processor, the memory selected from one of an SDRAM memory and an RDRAM memory, the memory including data that, when accessed by the processor, cause the processor to perform operations comprising,
calculating an exit-enter time (EET) to exit and enter a context and a save-restore time (SRT) to save and restore a machine state;
executing a selective algorithm that saves and restores the machine state on selected context changes and accumulating statistics for an expected value for EET overhead and an expected value for SRT overhead while executing the selective algorithm;
computing a first cost of the selective algorithm using the expected value for EET overhead and the expected value for SRT overhead;
executing a second selective algorithm that selectively saves and restores the machine state when there is a change of context;
accumulating statistics on an expected value for EET per context change plus an expected value for SRT per context change for the second selective algorithm;
computing a second cost of the second selective algorithm as the expected value for EET per context change plus the expected value for SRT per context change;
computing a third cost of an unconditional algorithm that always saves and restores the machine state on context changes as two times SRT; and
selecting one of the selective algorithm, the second selective algorithm, or the unconditional algorithm having the least cost as a virtualization algorithm to virtualize context changes.

58. The system of claim 57, wherein calculating the EET and the SRT is performed only once and the EET and the SRT are saved.

59. The system of claim 57, wherein the selective algorithm saves and restores the machine state before passing control to a virtual machine (VM) only if unprivileged instructions allowing use of the machine state are available to the VM.

60. The system of claim 59, wherein accumulating statistics includes:
obtaining a fraction of correct predictions where the machine state is not saved before passing control to the VM and the machine state is not used by the VM; and
obtaining a fraction of incorrect predictions where the machine state is not saved before passing control to the VM and the machine state is used by the VM;
wherein selecting one of the selective algorithm or the unconditional algorithm includes:
comparing a ratio of EET and SRT to a ratio of the fraction of correct predictions and the fraction of incorrect predictions.

61. The system of claim 57, wherein the selective algorithm virtualizes configuration of a processor such that the processor makes all instructions that use the machine state privileged to a virtual machine (VM) and saves and restores the machine state in connection with passing control to a virtual machine (VM) only if the VM executes a privileged instruction that uses the machine state.

62. The system of claim 61, wherein accumulating statistics includes:

obtaining a fraction of executions where the machine state is not used by the VM; and obtaining an average number of exceptions raised by each execution of the VM;

wherein selecting one of the first or the selective algorithm includes:

comparing a ratio of EET and SRT to a ratio of the fraction of executions and the average number of exceptions.

63. The system of claim 57, wherein executing, accumulating, computing, and selecting are performed periodically.

* * * * *